(12) United States Patent
Dove

(10) Patent No.: US 12,621,215 B1
(45) Date of Patent: May 5, 2026

(54) OPTICAL MODULE DRIVER CONTAINERIZATION

(71) Applicant: Calix, Inc., San Jose, CA (US)

(72) Inventor: Jason W. Dove, Novato, CA (US)

(73) Assignee: Calix, Inc., San Jose, CA (US)

( * ) Notice: Subject to any disclaimer, the term of this patent is extended or adjusted under 35 U.S.C. 154(b) by 293 days.

(21) Appl. No.: 18/446,868

(22) Filed: Aug. 9, 2023

(51) Int. Cl.
H04L 41/00 (2022.01)
H04L 67/00 (2022.01)
H04Q 11/00 (2006.01)

(52) U.S. Cl.
CPC .............. *H04L 41/20* (2013.01); *H04L 67/34* (2013.01); *H04Q 11/0067* (2013.01)

(58) Field of Classification Search
None
See application file for complete search history.

(56) References Cited

U.S. PATENT DOCUMENTS

| | | | | |
|---|---|---|---|---|
| 9,229,750 B1 * | 1/2016 | Mehat | ................. | G06F 9/45558 |
| 2018/0203437 A1 * | 7/2018 | Kubat | ..................... | G06F 3/011 |
| 2021/0117179 A1 * | 4/2021 | Park | ......................... | G06F 8/65 |
| 2021/0258265 A1 * | 8/2021 | Guim Bernat | ...... | G06F 11/3006 |
| 2021/0405314 A1 * | 12/2021 | Wingrove | .......... | H04B 10/0795 |
| 2023/0086234 A1 * | 3/2023 | Rajagopalan | ............. | G06F 8/65 |
| | | | | 717/168 |

* cited by examiner

*Primary Examiner* — Ario Etienne
*Assistant Examiner* — Mohammad Yousuf A. Mian
(74) *Attorney, Agent, or Firm* — Shumaker & Sieffert, P.A.

(57) ABSTRACT
A system includes one or more memories and processing circuitry coupled to the one or more memories, wherein the processing circuitry is configured to: execute operating system (OS) software configured to control operation of a plurality of hardware optical modules of a network element, and execute a first containerized driver software for a first set of one or more hardware optical modules of the plurality of hardware optical modules to enable the OS software and the first set of one or more hardware optical modules to communicate with each other, the first containerized driver software being packaged and deployed separately from the OS software.

17 Claims, 5 Drawing Sheets

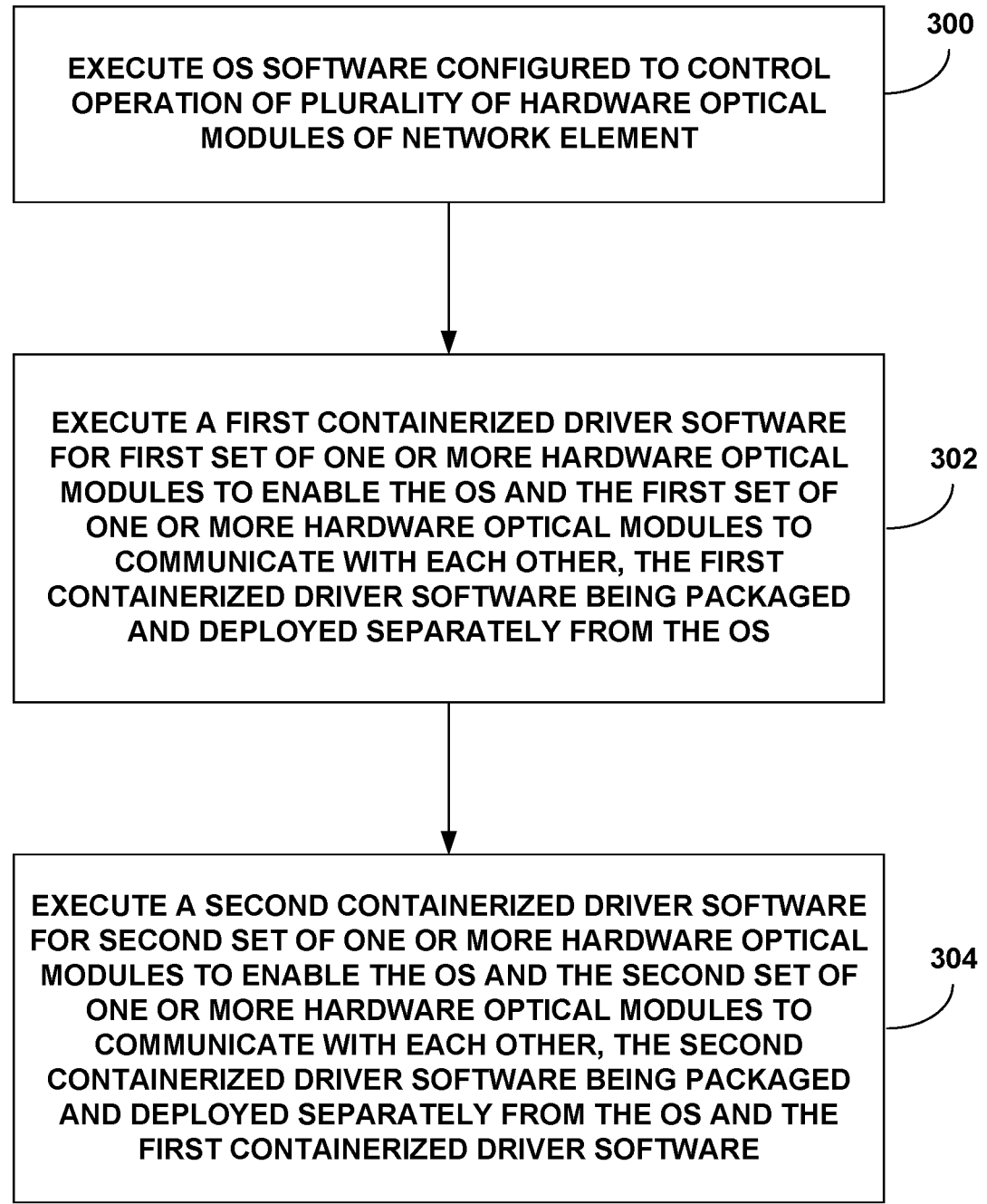

EXECUTE OS SOFTWARE CONFIGURED TO CONTROL OPERATION OF PLURALITY OF HARDWARE OPTICAL MODULES OF NETWORK ELEMENT

300

EXECUTE A FIRST CONTAINERIZED DRIVER SOFTWARE FOR FIRST SET OF ONE OR MORE HARDWARE OPTICAL MODULES TO ENABLE THE OS AND THE FIRST SET OF ONE OR MORE HARDWARE OPTICAL MODULES TO COMMUNICATE WITH EACH OTHER, THE FIRST CONTAINERIZED DRIVER SOFTWARE BEING PACKAGED AND DEPLOYED SEPARATELY FROM THE OS

302

EXECUTE A SECOND CONTAINERIZED DRIVER SOFTWARE FOR SECOND SET OF ONE OR MORE HARDWARE OPTICAL MODULES TO ENABLE THE OS AND THE SECOND SET OF ONE OR MORE HARDWARE OPTICAL MODULES TO COMMUNICATE WITH EACH OTHER, THE SECOND CONTAINERIZED DRIVER SOFTWARE BEING PACKAGED AND DEPLOYED SEPARATELY FROM THE OS AND THE FIRST CONTAINERIZED DRIVER SOFTWARE

OPTICAL MODULE DRIVER CONTAINERIZATION

TECHNICAL FIELD

This disclosure relates to networking, and more particularly, updates at devices that support pluggable optical modules in an optical network.

BACKGROUND

There are various examples of devices in which an optical network into which one or more optical modules are plugged as part of an optical network. One example of such a device is in an optical line terminal (OLT), but other network elements such as aggregation routers are possible. An OLT is a network device that functions as a service provider endpoint in an optical network, such as a passive optical network (PON). Example network elements convert electrical signals into optical signals for downstream transmission to optical network units (ONUs) at subscriber premises, and converts optical signals into electrical signals from upstream transmissions from the ONUs. ONUs are one example, and other examples of devices are possible. The network element includes a plurality of sockets into which respective pluggable hardware optical modules can be plugged, and each pluggable optical modules transmits signals to and receives signals from one or more ONUs. The network element may be manufactured by one manufacturer, but one or more pluggable optical modules may be manufactured by other manufacturers and supported by the manufacturer of the network element. That is, the other manufacturers may develop respective optical modules for plugging into the network element, and the network element may be configured to support those optical modules. The network element may also support pluggable modules developed by the manufacturer of the network element.

BRIEF DESCRIPTION OF DRAWINGS

FIG. 3 is a flowchart illustrating an example method of operation in accordance with techniques described in this disclosure.

DETAILED DESCRIPTION

Figure 1:
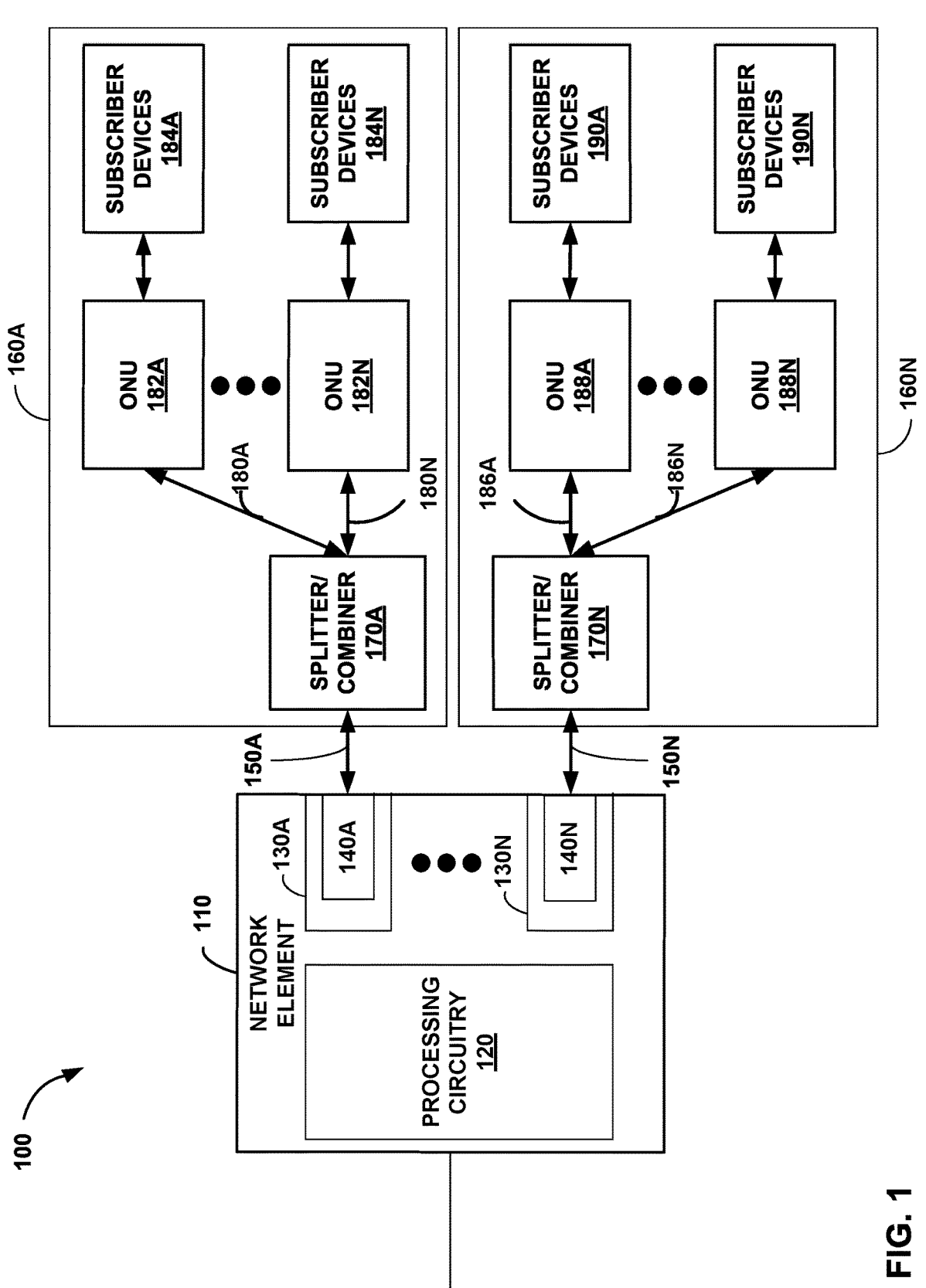
FIG. 1 is a block diagram illustrating a network, in accordance with one or more aspects of this disclosure.

An optical network includes an optical line terminal (OLT), an optical splitter/combiner, and a plurality of optical network units (ONUs) at subscriber premises. One example of the optical network is a passive optical network (PON), but other examples of optical networks are possible, and the techniques are not limited to PONs. The OLT may be configured to function as an endpoint for a service provider. For instance, the service provider may provide access to the Internet, local area networks (LANs), wide area networks (WANs), etc. to users of the service provider. For downstream transmission to the ONUs, the service provider may provide the downstream content to the OLT, which then converts the electrical signals of the downstream content into optical signals for transmission to the ONUs of users of the service provider. For upstream transmission from the ONUs, the OLT converts the optical signal into electrical signals for further transmission to the Internet.

One OLT may be configured to support one or more optical networks of one or more service providers. For instance, the OLT includes a plurality of sockets. Each socket is configured to receive a pluggable hardware optical module. The optical module is configured to convert electrical signals to optical signals for downstream communications, and convert optical signals to electrical signals for upstream communications. Each optical module may be configured to support a plurality of ONUs. For instance, a first optical module is coupled to a first optical splitter/combiner, and a first set of ONUs is coupled to the first optical splitter/combiner. A second optical module is coupled to a second optical splitter/combiner, and a second set of ONUs is coupled to the second optical splitter/combiner.

The above example of an OLT supporting a plurality of pluggable optical modules is provided as one example, and should not be considered limiting. The OLT is an example of a network element. Other examples of the network element include aggregation routers, switches, and other such devices into which an optical module may be plugged. Moreover, in some examples, there may be no ONUs. Rather, a socket of one network element communicates with a socket of another network element via point to point Ethernet. For case of illustration only, the examples are described with respect to an OLT and ONUs, but the examples should not be considered limited as such.

In some examples, each optical module is associated with an optical network. For instance, in the above example, the first optical module, the first optical splitter/combiner, and the first set of ONUs form a first optical network, and the second optical module, the second optical splitter/combiner, and the second set of ONUs form a second optical network. However, there may be different ways in which to form optical networks as well. As an example, an aggregation network element may include optical modules for a PON and other optical modules for an Ethernet based network.

For downstream communication, the first optical module (e.g., as part of OLT, aggregation network element, switch, or part of point-to-point network) transmits a first optical signal. In some examples, the first optical splitter/combiner that splits the first optical signal for transmission to the first set of ONUs. For upstream communication, the first set of ONUs transmit to the first optical splitter/combiner that combines the optical signal for transmission to the first optical module. The second optical module, second splitter/combiner, and second set of ONUs operate in a same way. As described, other configurations are possible as well.

The optical modules of the network element (e.g., OLT, aggregation network element, switch, etc.) may be replaceable (e.g., physically replaceable), upgradeable (e.g., via software upgrades), and may be from multiple different manufacturers. For instance, a manufacturer of the network element may be tasked with supporting optical modules of the manufactured by the manufacturer of the network element, but also optical modules manufactured by other manufacturers. The term "manufacturer" is used to indicate the owner, seller, developer, designer, etc. of the network element or optical modules.

This disclosure describes example techniques of utilizing containerized driver software for the optical modules of the network element. For instance, an operating system (OS) of the network element may be configured to control operation of the plurality of hardware optical modules on the network element. For instance, the OS may provide device management, network interface, service provisioning, security, and fault management, as a few examples. Each of the optical modules of the network element may be associated with respective driver software, including respective application programming interfaces (APIs), to enable or disable (e.g., allow) the OS and the respective optical modules to communicate with each other. By utilizing containerized driver software, as described in more detail, the example techniques allow for new optical module recognition, driver upgrades, etc. in a manner that requires little to no modification to the underlying OS image.

For instance, the driver software of the optical modules may be considered as "containers." A container may be software that is packaged and deployed separately from the OS. The container includes the application that is executed, and libraries and services that the application uses such that the application generally does not need to access libraries or services outside its "container" for execution. That is, a containerized driver software for one module may be isolated from the OS and from containerized driver software of another module. Because containers are packaged and deployed separately from the host hardware computing environment, the driver software of an optical module can be tied to a container image and executed as a single lightweight package on any host or virtual host (e.g., OS of the network element) that supports the underlying container architecture. Furthermore, containers provide an isolated environment that is more secure than a typical virtual machine setup, allowing developers to more easily deploy software with confidence.

In some techniques that do not rely upon containerized drivers, each instance of an upgrade of a driver software of an optical module (e.g., a replacement for the current driver software), or each instance of an optical module from a different manufacturer may require a new build of the OS to integrate the driver software of the optical module into a new OS image. Creating new OS images for new or updated driver software may be undesirable for various reasons. As one example, deployment of the new optical module may be delayed while the driver software is integrated into the OS. As another example, the manufacturer of the optical module and the developer of the OS may be different entities that want to limit sharing of information, which may be required if the driver software is integrated with the OS. As another example, security, software upkeep, etc. may be tasked to the OS for an optical module that is manufactured by an entity other than the developer of the OS.

In accordance with one or more examples, with the need to integrate and test new, increasingly complex and intelligent optical module technology, the example techniques may allow for the disaggregation of the handling of per optical module driver software from the network element OS. As new optical modules may "trickle" down from the more rapidly growing datacenter, site interconnect, and metro/long haul transport markets, in order to integrate, test and deploy sub-system components with very different life cycle cadences, this disclosure describes examples of using containerized driver software.

For example, for firmware updates that require driver software of an optical module, the network element OS may receive the firmware update and pass the firmware to the optical module through the containerized driver software without any changes to the OS. In general, containerizing driver software for optical modules of the network element can improve scalability in multiple ways. By containerizing the driver software, it may be possible for manufactures of the optical module to deploy multiple instances of the driver software, running on the same network element with different parameters, allowing the containerized driver software to scale quickly and easily meet the demands of applications of the optical modules.

In some examples, having containerized driver software can increase the amount of available data and processing power, as each instance of the driver software may operate separately and independently. For example, if the driver software for all different manufactures is integrated into the OS, the OS can be become bulky (e.g., require relatively large amount of memory, and relatively high number of processing cycles to perform operations).

In addition to scalability, containerizing driver code can also improve API compatibility and versioning. For example, by separating the driver software into isolated containers, developers can have multiple variations of driver software running at the same time and can ship API updates independently. In this manner, it may be easier to upgrade components of the driver codebase (e.g., easier to replace components of the driver codebase with newer or different components), without having to affect other driver software or applications running on the same hardware. This can simplify the development process, and make API changes easier to roll out, without having to worry about backward compatibility or disrupting other services and applications.

FIG. 1 is a block diagram illustrating a network 100. For purposes of illustration, the example implementations described in this disclosure are described in context of an optical network. However, aspects of this disclosure are not so limited, and can be extended to other types of networks such as cable or digital subscriber line (DSL) based networks, or Active Ethernet which may be considered as optical transmission and reception in accordance with the Ethernet protocol. Active Ethernet is defined by the IEEE 802.3ah standard (e.g., in clause 59 of the 802.3ah standard). Examples of network 100 also include shared-medium transports such as WiFi and RF/DOCSIS.

Network 100 may deliver voice, data and video content (generally "information") to a number of network nodes via optical fiber links. In some examples, network 100 may be arranged to deliver Internet Protocol television (IPTV) and other high speed information (e.g., information transmitted at approximately 200 Mbps or higher). Network 100 may conform to any of a variety of PON standards, such as the broadband PON (BPON) standard (ITU G.983), Ethernet PON (EPON), the gigabit-capable PON (GPON) standard (ITU G.984), or 10 giga-bit NGPON, as well as future PON standards under development by the Full Service Access Network (FSAN) Group, such as 10G GPON (ITU G.987), or other organizations.

In the example of FIG. 1, network element 110 may receive voice information, for example, from a public switched telephone network (PSTN) via a switch facility. As one example, network element 110 is an OLT. However, the examples are not so limited. In general, network element 110 may be any device into which pluggable optical modules (e.g., described in more detail) are plugged. For instance, network element 110 may be an aggregation network element (e.g., aggregation router) or a switch.

Moreover, in the example illustrated in FIG. 1, and described below, network element 110 communicates with ONUs 182A-182N and 188A-188N. However, in some examples, a network element may be configured to communicate with another network element as part of a point-to-point communication (e.g., there are no ONUs), and the techniques described in this disclosure may be applicable to such examples as well. Also, in some examples, network element 110 may support different networks such as a PON and an optical Ethernet (e.g., active Ethernet) network. For case of illustration, the examples are described with respect to a PON.

In addition, network element 110 may be coupled to one or more Internet service providers (ISPs) via the Internet and a router. In some examples, network element 110 may receive video content from video content suppliers via a streaming video headend. Video also may be provided as packet video over the Internet. In each case, network element 110 receives the information, and distributes it along optical fiber links 150A-150N, referred to as optical fiber links 150, to respective optical splitter/combiners 170A-170N, referred to as optical splitter/combiners 170.

For instance, network element 110 includes a plurality of sockets 130A-130N, referred to as sockets 130. Each one of sockets 130 is configured to receive one of pluggable optical modules 140A-140N, referred to as optical modules 140. Each of optical modules 140, also referred to as optical transceivers 140, may have a multi-source agreement (MSA) form factor. For example, one or more optical modules 140 may have the form factor of small form-factor pluggable (SFP), quad small form-factor pluggable 28 (QSFP28), quad small form-factor pluggable double density (QSFP-DD), etc. Each one of sockets 130 may be configured to receive one of the example form factors. Other form factors are possible, and optical modules that do not conform to a particular MSA are also possible. Different examples of network element 110 may include different types of optical modules 140.

Each one of optical modules 140 are coupled to respective ones of optical fiber links 150 to transmit downstream communication and receive upstream communication. For instance, for downstream communication, each one of optical modules 140 may receive electrical signals that optical modules 140 convert to optical signals for transmission on respective optical fiber links 150. For upstream communication, each one of optical modules 140 may receive optical signals from respective optical fiber links 150 that optical modules 140 convert to electrical signals.

In some examples, each one of optical modules 140 may support one or more optical networks, or two or more optical modules 140 may support one optical network. For instance, in the example of FIG. 1, optical module 140A may support (e.g., form as a service provider endpoint) for optical network 160A (e.g., passive optical network (PON) 160A), and optical module 140N may support (e.g., form as a service provider endpoint) for optical network 160N (e.g., PON 160N). Optical network 160A and 160N may be supported by the same or different network service provider. Also, in some examples, optical module 140A may support a PON, while optical module 140B supports an active Ethernet network (or some other network).

In the example of FIG. 1, optical network 160A includes optical splitter/combiner 170A, optical fiber links 180A-180N that couple optical splitter/combiner 170A to respective ones of optical network units (ONUs) 182A-182N. Each one of ONUs 182A-182N are coupled to respective ones of subscriber devices 184A-184N. Similarly, optical network 160N includes optical splitter/combiner 170B, optical fiber links 186A-186N that couple optical splitter/combiner 170B to respective ones of ONUs 188A-188N. Each one of ONUs 188A-188N are coupled to respective ones of subscriber devices 190A-190N.

ONUs 182A-182N and ONUs 188A-188N may be substantially similar. In some examples, optical network 160A and 160N may be each include 128 ONUs 182A-182N and 188A-188N, respectively, but the example techniques are not so limited. ONUs 182A-182N and 188A-188N are examples of a network interface device. Other examples of a network interface device include, but are not limited to, a cable modem or a DSL modem. The example techniques may be usable with other types of network interface devices other than ONUs. However, for purposes of illustration but without limitation, the example implementations described in the disclosure are described in the context of ONUs.

Each one of ONUs 182A-182N may reside at or near a subscriber premises that includes one or more subscriber devices 184A-184N. Similarly, each one of ONUs 188A-188N may reside at or near a subscriber premises that includes one or more subscriber devices 190A-190N. The subscriber premises may be a home, a business, a school, or the like. A single ONU may be capable of transmitting information to and receiving information from one or more subscriber premises.

Examples of the subscriber devices 184A-184N or 190A-190N include, but are not limited to, one or more computers (e.g., laptop and desktop computers), network appliances, televisions, game consoles, set-top boxes, wireless devices, media players or the like, for video and data services, and one or more telephones for voice services. Subscriber devices 184A-184N or 190A-190N may also include household appliances such as furnaces, washer and dryers, freezers, refrigerators, thermostats, lights, security systems, and the like.

In some examples, ONUs 182A-182N and ONUs 188A-188N may not be needed. For instance, network element 110 may communicate with another network element. In such examples, optical modules 140 may be configured to communicate with respective optical modules on the other network element.

In general, the example network 100 that includes optical networks 160A and 160N is provided for purposes of illustration only, and should not be considered as limiting. There may be various configurations of network 100 that are consistent with the example techniques described in this disclosure.

Network element 110 transmits downstream information (e.g., communication) to and receives upstream information (e.g., communication) from ONUs 182A-182N via fiber link 150A coupled to splitter/combiner 170A, and transmits downstream information to and receives upstream information from ONUs 188A-188N via fiber link 150B coupled to splitter/combiner 170B. Downstream information may be considered to be information transmitted by network element 110 and received by ONUs 182A-182N and 188A-188N. Upstream information may be considered to be information transmitted by each one of ONUs 182A-182N and 188A-188N and received by network element 110.

In some examples, optical splitter/combiners 170A and 170N may be a passive splitter/combiner. A passive splitter/combiner may not need to be powered. For downstream transmission, including voice, video, and data information from network element 110, optical splitter/combiners 170A and 170N receive the downstream information and split the downstream information for downstream transmission to ONUs 182A-182N and ONUs 188A-188N, respectively, via respective fiber links 180A-180N and 186A-186N, respectively. For upstream information, including voice and data information from each one of ONUs 182A-182N or 188A-188N, optical splitter/combiner 170A or 170N receives upstream information from ONUs 18A-182N or 188A-188N, respectively, via respective fiber links 180A-180N or 186A-186N and combines the upstream information for transmission to network element 110.

In some examples, optical splitter/combiner 170A or 170N may not be a passive splitter/combiner, but rather an active splitter/combiner. In these examples, optical splitter/combiner 170A or 170N may be powered locally. In these examples, optical splitter/combiner 170A or 170N may function as a switch, router, multiplexer, and the like.

ONUs 182A-182N and 188A-188N receive and transmit information via respective fiber links 180A-180N or 186A-186N. Also, network element 110 receives and transmits information via fiber links 150A and 150N. To differentiate between transmission and reception, each one of ONUs 182A-182N and 188A-188N may be configured to transmit voice and data information with an optical signal with a wavelength of 1310 nanometer (nm), receive voice and data information with an optical signal with a wavelength of 1490 nm, and receive video information with an optical signal with a wavelength of 1550 nm. Network element 110 may be configured to receive voice and data information with an optical signal with a wavelength of 1310 nm, transmit voice and data information with an optical signal with a wavelength of 1490 nm, and transmit video infor-mation with an optical signal with a wavelength of 1550 nm. These wavelengths are provided merely as examples.

Each one of ONUs 182A-182N and 188A-188N may be configured to transmit upstream information according to time division multiple access (TDMA) techniques. For instance, network element 110 may grant or assign to each of subscriber devices 184A-184N and 190A-190N certain timeslots during which to transmit upstream information. Each one of ONUs 182A-182N and 188A-188N transmits information to network element 110 based on the timeslots assigned to each of respective subscriber devices 184A-184N or 190A-190N. The timeslot for each one ONUs 182A-182N may be different and the timeslot for each one of ONUs 188A-188N may be different to avoid collision.

As illustrated, network element 110 includes processing circuitry 120. Example of processing circuitry 120 includes one or more digital signal processors (DSPs), general pur-pose microprocessors, application specific integrated cir-cuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully imple-mented in one or more circuits or logic elements (e.g., such as in an integrated circuit (IC) or a set of ICs). Although not shown in FIG. 1, but shown in FIG. 2, network element 110 includes one or more memories, examples of which include RAM, ROM, EEPROM, optical disk storage, magnetic disk storage, flash memory, and the like.

In one or more examples, processing circuitry 120 may be configured to execute operating system (OS) software con-figured to control operation of a plurality of hardware optical modules 140 of network element 110. For instance, the OS, via processing circuitry 120, may be configured to assign timeslots according to the TDMA techniques. The OS may be configured to perform other operations as well, such as initializing, configuring, and monitoring system resources of processing circuitry 120 and one or more memories. The OS may provide the necessary protocols and interfaces to com-municate with ONUs 182A-182N or 188A-188N. For instance, the OS may handle the establishment and termination of connections, data encapsulation and de-encapsu-lation, and routing of network traffic to and from ONUs 182A-182N or 188A-188N. The OS may support provision-ing of the services such as the voice, data and video content. The OS may provide security and fault management as well.

As part of the operations of the OS software, the OS software may send information to and receive information from optical modules 140. To enable (e.g., allow) for such communication between the OS software and optical mod-ules 140, processing circuitry 120 may be configured to execute driver software for optical modules 140 to enable the OS software and optical modules 140 to communicate with each other.

This disclosure describes examples of utilizing contain-erized driver software for optical modules 140 to enable the OS software and optical modules 140 to communicate with each other. By containerizing the driver software for optical modules 140, changes to the driver software, loading of the driver software, and scalability of the driver software may be enhanced. Containerizing the driver software may also improve application programming interface (API) compat-ibility and versioning.

For example, as described above, by containerizing the driver code, developers can deploy multiple instances of the driver, running on the same hardware with different param-eters, allowing drivers to be scaled quickly and easily to meet the demands of operations of optical modules 140. Also, the containers provide an isolated environment that is more secure than a typical virtual machine setup, allowing entities (e.g., developers of the driver software) to more easily deploy drivers with confidence.

Furthermore, by separating the driver software into iso-lated containers, an entity can have multiple variations of driver software running at the same time and can ship API updates independently. This makes it easier to upgrade (e.g., replace) components of the driver software codebase, with-out having to affect other driver software or applications running on the same hardware. This can simplify the devel-opment process, and make API changes easier to roll out, without having to worry about backward compatibility or disrupting other services and applications.

To utilize containerization techniques, processing cir-cuitry 120 may utilize a container management framework (e.g., Docker™ or Kubernetes™), and the OS software of processing circuitry 120 may be configured to perform container management operations. For example, the con-tainer management of the OS software executing on pro-cessing circuitry 120 may be configured to instantiate a Null or Boot container for one or more of sockets 130. In some examples, the container management of the OS software executing on processing circuitry 120 may be configured to instantiate one Null or Boot container for each one of sockets 130 that is for respective optical modules 140 coupled into respective sockets 130.

One example purpose of the Null or Boot container is to function as a placeholder into which processing circuitry 120 can upload the containerized driver software. Process-ing circuitry 120 may receive the containerized driver soft-ware from the container management framework, and upload the containerized driver software into the Null or Boot container.

As an example, assume that the driver software for optical module 140A and the driver software for optical module 140N is different (e.g., due to different manufacturers, different types of optical modules, different versions of optical modules, etc.). For case, assume that optical module 140A is an optical module of a first set of one or more hardware optical modules, and the containerized driver for optical module 140A is a first containerized driver software. Assume that optical module 140N is an optical module of a second set of one or more hardware optical modules, and the containerized driver for optical module 140N is a second containerized driver software.

In the example, the container management of the OS software executing on processing circuitry 120 may be configured to instantiate a first Null or Boot container for socket 130A and a second Null or Boot container for socket 130N. Processing circuitry 120 may receive the first containerized driver software for optical module 140A, and update the first Null or Boot container with the first containerized driver software. Similarly, processing circuitry 120 may receive the second containerized driver software for optical module 140N, and update the second Null or Boot container with the second containerized driver software.

Processing circuitry 120 may execute the first containerized driver software for the first set of one or more hardware optical modules (e.g., optical module 140A) of the plurality of hardware optical modules (e.g., optical modules 140) to enable the OS and the first set of one or more hardware optical modules to communicate with each other. As described, the first containerized driver software is packaged and deployed separately from the OS. Similarly, processing circuitry 120 may be configured to execute a second containerized driver software for a second set of one or more hardware optical modules (e.g., optical module 140N) of the plurality of hardware optical modules (e.g., optical modules 140). The second containerized driver software is packaged and deployed separately from the OS and the first containerized driver software.

Figure 2A:
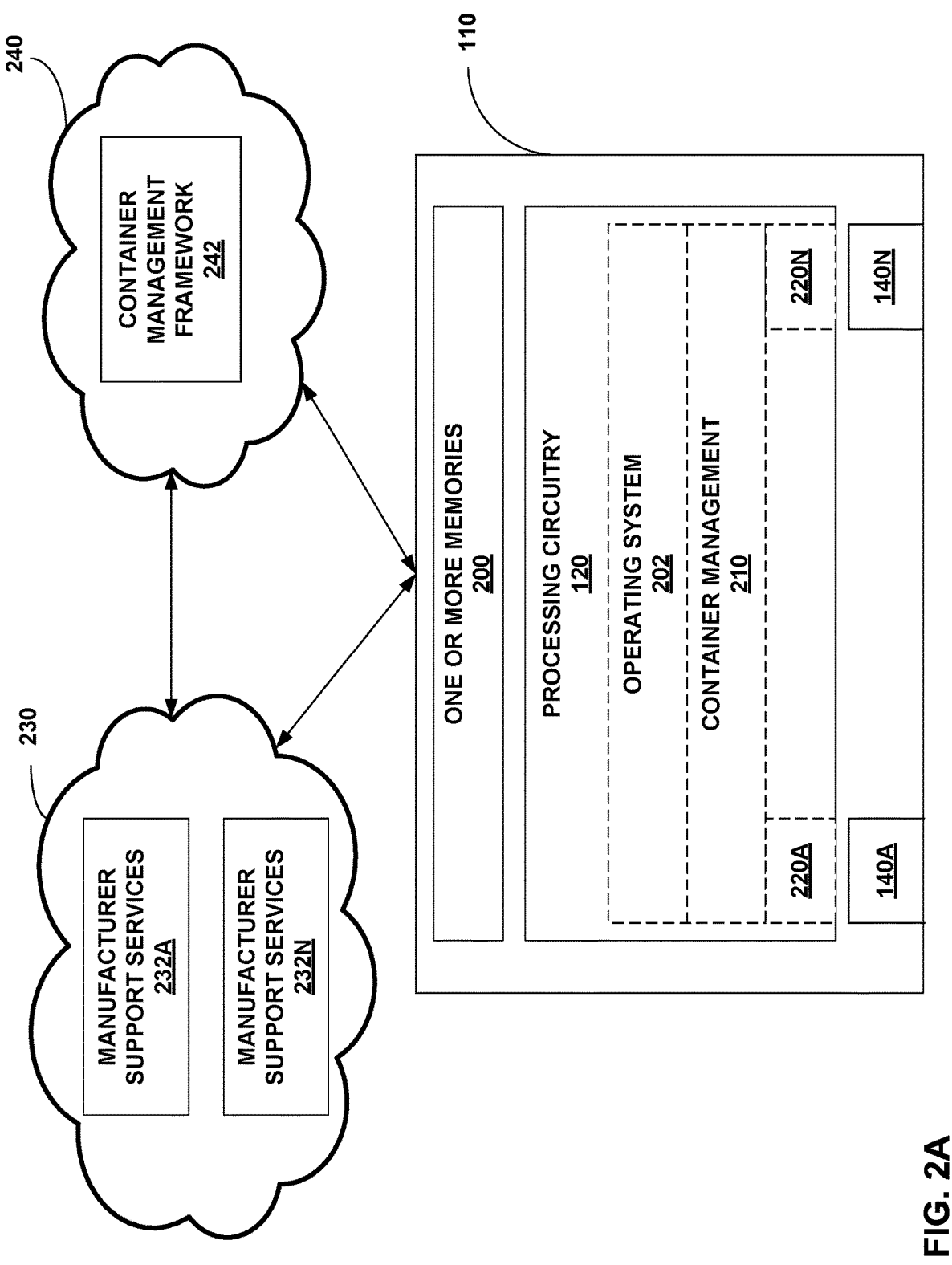
FIGS. 2A and 2B are block diagrams illustrating an example of a network element in accordance with the techniques described in this disclosure.
Figure 2B:
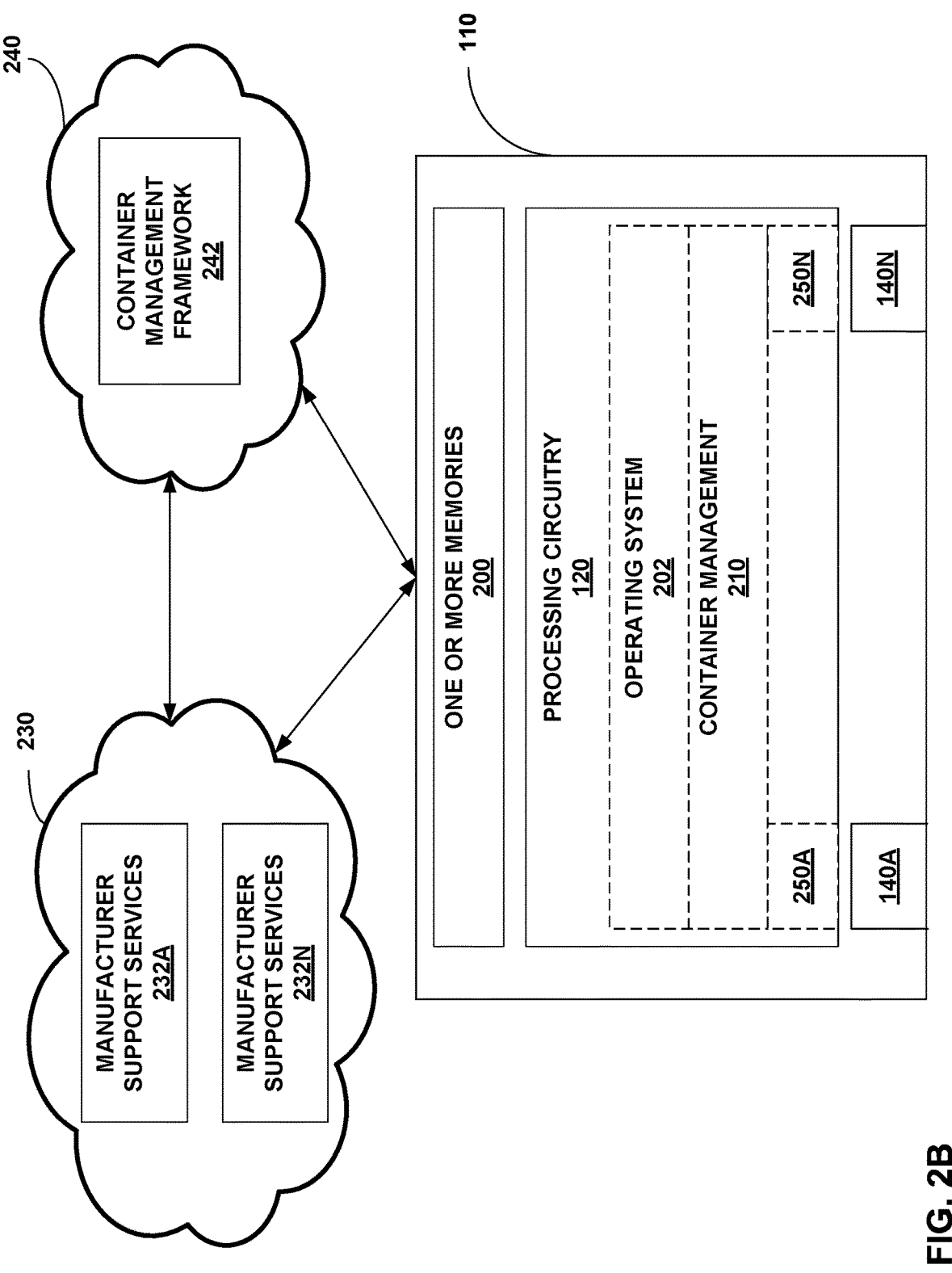

FIGS. 2A and 2B are block diagrams illustrating an example of a network element in accordance with the techniques described in this disclosure. For instance, FIG. 2A illustrates an example in which processing circuitry 120 instantiates null containers 220A and 220N, and FIG. 2B illustrates an example in which processing circuitry 120 loads first containerized driver 250A and second containerized driver 250N. Similar reference numbers in FIGS. 2A and 2B refer to substantially the same including identical components.

In FIGS. 2A and 2B, network element 110 includes one or more memories 200. Examples of one or more memories 200 include RAM, ROM, EEPROM, optical disk storage, magnetic disk storage, flash memory, and the like. One or more memories 200 may store object code, complied code, etc. that is executed by processing circuitry 120, and may store values generated by processing circuitry 120 or received by processing circuitry 120. Processing circuitry 120, together with one or more memories 200, may be configured to perform example techniques described in this disclosure.

FIGS. 2A and 2B illustrate cloud computing system 230 and cloud computing system 240. Cloud computing system 230 includes processing circuitry, one or more memories, etc. to support manufacturer support services 232A and manufacturer support services 232N. As an example, assume that a first manufacturer developed optical module 140A, and developed manufacturer support services 232A. Assume that a second manufacturer developed optical module 140N, and developed manufacturer support services 232N. In this example, the first manufacturer may develop manufacturer support services 232A to transmit updates and other information to optical module 140A, and the second manufacturer may develop manufacturer support services 232N to transmit updates and other information to optical module 140N.

Examples of manufacturer support services 232A may software that receives information of how much data optical module 140A is transmitting or receiving, the type of data that optical module 140A is transmitting or receiving, the temperature, operation, fault information etc. Manufacturer support services 232N may be similar as manufacturer support services 232N but for optical module 140N. Other examples of manufacturer support services are possible.

In some cases, the first manufacturer and the second manufacturer may not want the other manufacturer to have knowledge of information that the first manufacturer is transmitting to or receiving from optical module 140A or have knowledge of information that the first manufacturer is transmitting to or receiving from optical module 140N. Similarly, the first manufacturer and the second manufacturer may not want the manufacturer of network element 110 to have access or knowledge of information transmitted to or received from optical modules 140A and 140N, respectively.

For manufacturer support services 232A to access optical module 140A, manufacture support services 232A may utilize a first driver software for optical module 140A. For example, the first driver software for optical module 140A may provide operating system (OS) software 202 executing on processing circuitry 120 as a conduit to communicate with optical module 140A so that, while processing circuitry 120 may not be aware of the information, processing circuitry 120 can communicate with optical module 140A as a pathway for communication between manufacturer support services 232A and optical module 140A. For instance, OS software 202 may utilize an API for the first driver software to receive information from or transmit information to optical module 140A, which OS software 202 receives from or transmits to manufacturer support services 232A. Manufacturer support services 232N may access optical module 140N in a similar manner but utilize a second driver software for optical module 140N.

Container management framework 242 of cloud computing system 240 may be configured to provide container management for the manufacturers of optical module 140A and optical module 140N. For instance, the manufacturers of optical module 140A and 104N may develop respective driver software along with libraries and services used by the respective driver software to container management framework 242. Container management framework 242 may then containerize the respective driver software so that the respective driver software are individually packageable and deployable, and do not require other resources for operation. Similarly, if there are updates for the driver software, the respective manufacturers may update the driver software for containerization. Examples of container management framework 242 includes Docker™ and Kubernetes™.

Container management 210 may be a software service that is part of OS software 202 and is configured to provide container management functionality. In one or more examples, to allow support for containerization of driver software, container management 210 may be complied into operating system 202. Container management 210 functions in synergy with an externally hosted container management framework 242. In one example model, OS software 202 may provision each socket 130 to aggregated "non-container mode" by default. Container management 210 may then selectively re-provision sockets 130 for disaggregated "container" mode as needed.

As one example, in the example of FIG. 2A, container management 210 may be configured to instantiate null containers 220A and 220N, also called boot containers. Null containers 220A and 220N may be considered as pass-through containers with no operation upon optical modules 140A or 140N. Once null containers 220A and 220N are instantiated container management 210, null containers 220A and 220N functionality may be upgraded or down-graded during operation of network element 110 (e.g., on the fly).

In some examples, there may be different types of null containers. For example, sockets 130 may be assigned for different networks. As one example, socket 130A for optical module 140A may be assigned for network element discovery ports, and container management 210 may instantiate a null container that is meant for network element discovery ports for socket 130A. Socket 130N for optical module 140N may be assigned for a PON network (e.g., is a PON socket). In this example, container management 210 may instantiate a null container that is meant for PON network for socket 130N. Such different null containers may be considered as part of "split horizon" behavior.

The null containers 220A and 220N may provide other functionality. As one example, null containers 220A and 220N may support activation and deactivation. For instance, with the example techniques described in this disclosure, it may be possible to unplug or plug in optical modules 140 with little overhead cost to OS software 220. As an example, when socket 130A is empty, null container 220A may reside on processing circuitry for socket 130A. Upon insertion of optical module 140A, container management 210 may be able to read the identity of optical module 140A (e.g., through local out-of-band-I2C). Container management 210 may then access container management framework 242 and determine whether a containerized driver software is available for optical module 140A, and if so, access that containerized driver software for replacing null container 220A. If optical module 140A is removed, container management 210 may revert socket 130A to a null container 220A. There may be other ways in which container management 210 may determine to access containerized driver software, such as based on port provisioning (e.g., into which one of sockets 130 an optical module is inserted) or some custom key identification. Deactivation may be forced upon sockets 130 so as to revert back to null containers 220A and 220N based on license expiration in addition to examples where optical modules 140A and 140N are removed.

As illustrated in FIG. 2B, container 220A is replaced by first containerized driver software 250A and container driver software 220N is replaced by second containerized driver software 250N. For instance, container management framework 242 may have generated containerized driver software 250A and containerized driver software 250N. Network element 110 may receive containerized driver software 250A and containerized driver software 250N. Container management 210 may then update containers 220A and 220N with containerized driver software 250A and 250N, respectively. Processing circuitry 120 may execute containerized driver software 250A and 250N to enable containerized driver software 250A and 250N to communicate with OS software 202.

In some examples, containerized driver software 250A and 250N may be respective first instances of containerized driver software 250A and 250N. The manufacturers of optical module 140A and 140N may develop upgrades (e.g., replacements) for the driver software. In this example, container management framework 242 may generate respective second instances of containerized driver software 250A and 250N. In such examples, container management 210 may receive the respective second instances of the first containerized driver software 250A and the second containerized driver software 250N, the second instances being a replacement for (e.g., an upgrade over) the first instances. Container management 210 may replace the first instances of containerized driver software 250A and 250N with second instances of containerized driver software 250A and 250N. Processing circuitry 120 may execute the second instances of the containerized driver software 250A and 250N.

In the example of FIG. 2B, containerized driver software 250A and 250N may be linked with socket 130A for optical module 140A and socket 130N for optical module 140N, respectively, and a module identifier read from optical module 140A and 140N. For example, network element 110 includes a plurality of sockets 130, and each of the plurality of sockets 130 is configured to couple to one of the plurality of hardware optical modules 140. In one or more examples, each of the sockets 130 includes at least a portion of the processing circuitry 120. For instance, there may be one or more processors for each of sockets 130, and these one or more processors may be part of processing circuitry 120. In such examples, to execute the first containerized driver software 250A, the portion of the processing circuitry 120 associated with a first socket 130A into which a hardware optical module 140A is coupled is configured to execute the first containerized driver software 250A. Similarly, to execute the second containerized driver software 250N, the portion of the processing circuitry 120 associated with a second socket 130N into which a hardware optical module 140N is coupled is configured to execute the second containerized driver software 250N.

As one example, the at least a portion of the processing circuitry may be a virtual machine that is allocated to a particular one of socket 130. That is, the concept of a portion of processing circuitry need not necessarily mean, but is possible, that there is a dedicated circuitry for each of sockets 130. In some cases, rather than or in addition to having particular processing circuitry, OS software 202 may dedicate virtual machines for sockets 130 on which respective containerized driver software 250A or 250N is executed.

As described above, revision of containerized driver software 250A and 250N and the management of each of containerized driver software 250A and 250N may be located at various places within network 100. There may be many locations for the revision and management of containerized driver software 250A and 250N. As one example, container management framework 242 is tasked with revisions and managing containerized driver software 250A and 250N. However, in some examples, the containerization may be performed as part of manufacturers support services 232A or 232N. In some examples, network element 110 or OS software 202 may be configured to provide containerization services.

In some examples, at execution of containerized driver software 250A and 250N, there may be an initial bootup with provisioning to ensure OS software 202 and optical modules 140A and 140N can communicate with each other. In this initial bootup, containerized driver software 250A and 250N may allow for container management 210 to be uniquely identified so that container management 210 can read identifier information of containerized driver software 250A and 250N.

In the example of FIG. 2B, each one of sockets 130 is configured to execute a containerized driver software. However, the techniques are not so limited. In some examples, allocation can also have a "group scope" for a plurality of similar sockets or interface types. Possible allocation based upon socket type (QSFP-DD, QSFP28, SFP28, etc.), MAC type (PON, Ethernet) or open access per service provided. For instance, a plurality of sockets 130 may execute one containerized driver software.

Moreover, in one or more examples, containerized driver software 250A and 250N may be specially designed for optical modules 140A and 140N, respectively, but further also for components further downstream. For instance, containerized driver software 250A and 250N may include functionality to update operations of ONUs 182A-182N or ONUs 188A-188N, respectively.

In the example of FIGS. 2A and 2B, processing circuitry 120 may execute first containerized driver software 250A and second containerized driver software 250N. However, processing circuitry 120 may be configured to function using other techniques as well. For instance, OS software 202 may allow for techniques in which the driver software of an optical module is integrated as part of OS software 202. That is, the example techniques allow for both aggregated and integrated driver software for optical modules to coexist within a common compiled framework that includes containerized driver software 250A and 250N.

In one or more examples, the disclosure provides for OS software 202 to support the management and coexistent operation of both non-containerized aggregated driver software (e.g., aggregated into OS software 202) and new containerized disaggregated module drivers (e.g., containerized driver software 250A and 250N) on a per socket or set of sockets basis (e.g., for first set of one or more optical modules of a plurality of optical modules 140, and a for second set of one or more optical modules of a plurality of optical modules 140). For example, sockets 130 or sets of sockets 130 (e.g., first set of one or more sockets and second set of one or more sockets) may support a plurality of different, unique management domains and service models (e.g., for optical module 140A and 140N). These domains can be independently revised and deployed via the secure container management framework 242, in combination with container management 210. Accordingly, new optical module types and skus (stock keeping units) may leverage the example techniques described in this disclosure for rapid prototyping and runtime integration.

In some examples, once those models matured, the models may optionally be compiled into the aggregated codebase to better conserve resources of OS software 202 for future growth features. That is, it may be possible to include containerized driver software 250A and 250N in OS software 202 at some point if desired.

FIG. 3 is a flowchart illustrating an example method of operation in accordance with techniques described in this disclosure. In one or more examples, processing circuitry 120 may execute OS software 202 configured to control operation of a plurality of hardware optical modules 140 of network element 110 (300). For example, OS software 202, via processing circuitry 120, may be configured to assign timeslots according to the TDMA techniques. OS software 202 may be configured to perform other operations as well, such as initializing, configuring, and monitoring system resources of processing circuitry 120 and one or more memories 200. OS software 202 may provide the necessary protocols and interfaces for optical modules 140A and 140N to communicate with ONUs 182A-182N or 188A-188N. For instance, OS software 202 may handle the establishment and termination of connections, data encapsulation and de-encapsulation, and routing of network traffic from optical modules 140A and 140N to ONUs 182A-182N or 188A-188N and from ONUs 182A-182N or 188A-188N to optical modules 140A and 140N. OS software 202 may support provisioning of the services such as the voice, data and video content that optical modules 140A and 140N are to transmit and receive. OS software 202 may provide security and fault management as well.

Processing circuitry 120 may execute a first containerized driver software 250A for a first set of one or more hardware optical modules (e.g., optical module 140A) of the plurality of hardware optical modules 140 to enable the OS software 202 and the first set of one or more hardware optical modules (e.g., optical module 140A) to communicate with each other (302). The first containerized driver software 250A is packaged and deployed separately from the OS software 202.

Processing circuitry 120 may execute a second containerized driver software 250N for a second set of one or more hardware optical modules (e.g., optical module 140N) of the plurality of hardware optical modules 140 to enable the OS software 202 and the second set of one or more hardware optical modules (e.g., optical module 140N) to communicate with each other (304). The second containerized driver software 250N is packaged and deployed separately from the OS software 202 and first containerized driver software 250A.

Figure 4:
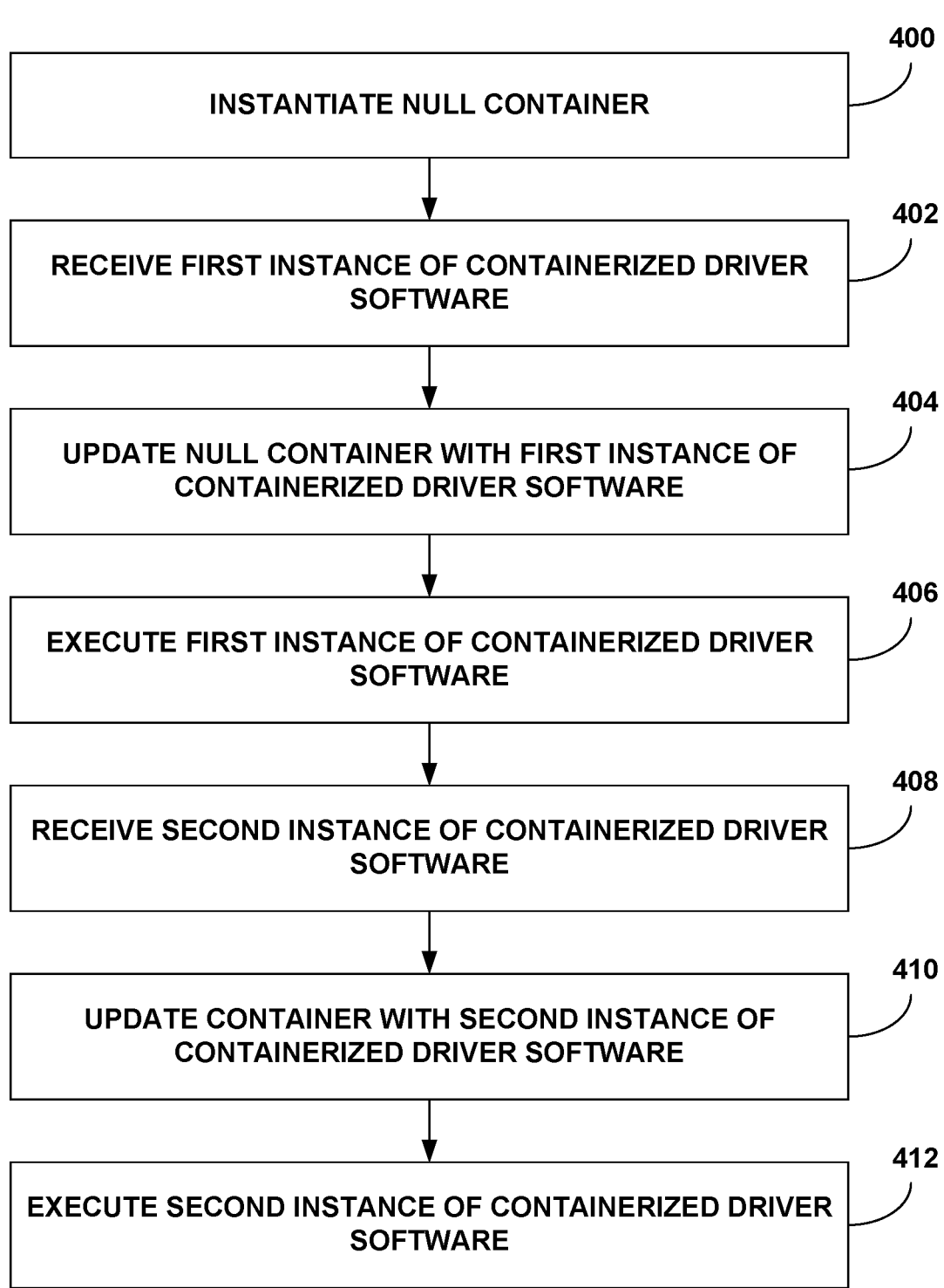
FIG. 4 is a flowchart illustrating another example method of operation in accordance with techniques described in this disclosure.

FIG. 4 is a flowchart illustrating another example method of operation in accordance with techniques described in this disclosure. Container management 210 of OS software 202 executing on processing circuitry 120 may initiate a null container (400). The null container may be considered as passthrough containers whose functionality may be upgraded or downgraded during operation of network element 110 (e.g., on the fly). In some examples, the null container that container management 210 instantiates may be based on the type of socket 130 for which container management 210 is instantiating the null container (e.g., one type of null container for network element discovery socket and another type of null container for PON socket).

The null container may also support activation and deactivation. For instance, when an optical module is inserted into the socket for which the null container is instantiated, container management 210 may be able to read the identity of optical module. Container management 210 may then access container management framework 242 and determine whether a containerized driver software is available for that optical module, and if so, access that containerized driver software for replacing the null container.

Container management 210 may receive a first instance of containerized driver software 250A (402). For instance, containerized management 210 may receive the first instance of containerized driver software 250A from container management framework 242, where the first instance of containerized driver software 250A is developed by the manufacturer of optical module 140A. Container management 210 may update the null container with the first instance of containerized driver software 250A (404), and execute the first instance of containerized driver software 250A (406).

Container management 210 may receive a second instance of containerized driver software 250A (408). For instance, containerized management 210 may receive the second instance of containerized driver software 250A from container management framework 242, where the second instance of containerized driver software 250A is developed by the manufacturer of optical module 140A and is a replacement for (e.g., an upgrade to) the first instance of containerized driver software 250A. Container management 210 may update the first instance of containerized driver software 250A with the second instance of containerized driver software 250A (410), and execute the second instance of containerized driver software 250A (412).

The following describes one or more example techniques of the disclosure. The examples may be performed together or separately.

Example 1. A system comprising: one or more memories; and processing circuitry coupled to the one or more memories, wherein the processing circuitry is configured to: execute operating system (OS) software configured to control operation of a plurality of hardware optical modules of a network element; and execute a first containerized driver software for a first set of one or more hardware optical modules of the plurality of hardware optical modules to enable the OS software and the first set of one or more hardware optical modules to communicate with each other, the first containerized driver software being packaged and deployed separately from the OS software.

Example 2. The system of example 1, wherein the processing circuitry is configured to: execute a second containerized driver software for a second set of one or more hardware optical modules of the plurality of hardware optical modules, the second containerized driver software being packaged and deployed separately from the OS and the first containerized driver software.

Example 3. The system of any of claims 1 and 2, wherein the processing circuitry is further configured to: instantiate a null container; receive the first containerized driver software; and update the null container with the first containerized driver software, wherein to execute the first containerized driver software, the processing circuitry is configured to execute the first containerized driver software subsequent to updating of the null container with the first containerized driver software.

Example 4. The system of any of examples 1-3, wherein the processing circuitry is configured to output a request for the first containerized driver software in response to detecting that a first optical module of the first of optical modules is plugged into a socket of the network element.

Example 5. The system of any of examples 1-4, wherein the first containerized driver software is a first instance of the first containerized driver software, and wherein the processing circuitry is configured to: receive a second instance of the first containerized driver software, the second instance being a replacement for the first instance; and execute the second instance of the first containerized driver software.

Example 6. The system of any of examples 1-5, wherein the network element comprises a plurality of sockets, wherein each of the plurality of sockets is configured to couple to one of the plurality of hardware optical modules, wherein each of the sockets includes at least a portion of the processing circuitry, and wherein to execute the first containerized driver software, the portion of the processing circuitry associated with a first socket into which a hardware optical module of the first set of one or more hardware optical modules is coupled is configured to execute the first containerized driver software.

Example 7. The system of example 6, wherein at least the portion of the processing circuitry comprises a virtual machine.

Example 8. The system of any of examples 1-7, wherein the OS software includes aggregated driver software for another set of one or more hardware optical modules of the plurality of hardware optical modules.

Example 9. The system of any of examples 1-8, further comprising a cloud computing system executing a container management framework, wherein the container management framework is configured to: receive a first driver software and libraries and services for the first driver software; and generate the first containerized driver software based on the first driver software and the libraries and services for the first driver software Example 10. A method comprising: executing, with processing circuitry, an operating system (OS) software configured to control operation of a plurality of hardware optical modules of a network element; and executing, with the processing circuitry, a first containerized driver software for a first set of one or more hardware optical modules of the plurality of hardware optical modules to enable the OS software and the first set of one or more hardware optical modules to communicate with each other, the first containerized driver software being packaged and deployed separately from the OS software.

Example 11. The method of example 10, further comprising: executing, with the processing circuitry, a second containerized driver software for a second set of one or more hardware optical modules of the plurality of hardware optical modules, the second containerized driver software being packaged and deployed separately from the OS and the first containerized driver software.

Example 12. The method of any of examples 10 and 11, further comprising: instantiating a null container; receiving the first containerized driver software; and updating the null container with the first containerized driver software, wherein executing the first containerized driver software comprises executing the first containerized driver software subsequent to updating of the null container with the first containerized driver software.

Example 13. The method of any of examples 10-12, further comprising outputting a request for the first containerized driver software in response to detecting that a first optical module of the first of optical modules is plugged into a socket of the network element.

Example 14. The method of any of examples 10-13, wherein the first containerized driver software is a first instance of the first containerized driver software, the method further comprising: receiving a second instance of the first containerized driver software, the second instance being a replacement for the first instance; and executing the second instance of the first containerized driver software.

Example 15. The method of any of examples 10-14, wherein the network element comprises a plurality of sockets, wherein each of the plurality of sockets is configured to couple to one of the plurality of hardware optical modules, wherein each of the sockets includes at least a portion of the processing circuitry, and wherein executing the first containerized driver software comprises executing, with the portion of the processing circuitry associated with a first socket into which a hardware optical module of the first set of one or more hardware optical modules is coupled, the first containerized driver software.

Example 16. The method of claim 15, wherein at least the portion of the processing circuitry comprises a virtual machine.

Example 17. The method of any of examples 10-16, wherein the OS software includes aggregated driver software for another set of one or more hardware optical modules of the plurality of hardware optical modules.

Example 18. The method of any of examples 10-17, further comprising: receiving, with a cloud computing system executing a container management framework, a first driver software and libraries and services for the first driver software; and generating the first containerized driver software based on the first driver software and the libraries and services for the first driver software.

Example 19. A computer-readable storage medium comprising instructions stored thereon that when executed cause one or more processors to: execute an operating system (OS) software configured to control operation of a plurality of hardware optical modules of a network element; and execute a first containerized driver software for a first set of one or more hardware optical modules of the plurality of hardware optical modules to enable the OS software and the first set of one or more hardware optical modules to communicate with each other, the first containerized driver software being packaged and deployed separately from the OS software.

Example 20. The computer-readable storage medium of example 19, further comprising instructions that cause the one or more processors to: execute a second containerized driver software for a second set of one or more hardware optical modules of the plurality of hardware optical modules, the second containerized driver software being packaged and deployed separately from the OS and the first containerized driver software.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. It should be understood that computer-readable storage media and data storage media do not include carrier waves, signals, or other transient media, but are instead directed to nontransient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "controller" as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/ or firmware.

Various examples have been described. These and other examples are within the scope of the following claims.

What is claimed is:

1. A system comprising:
one or more memories; and
processing circuitry coupled to the one or more memories, wherein the processing circuitry is configured to:
execute operating system (OS) software configured to control operation of a plurality of hardware optical modules of a network element;
subsequent to executing the OS or as part of executing the OS, execute a first containerized driver software for a first set of one or more hardware optical modules of the plurality of hardware optical modules to enable the OS software and the first set of one or more hardware optical modules to communicate with each other, the first containerized driver software being packaged and deployed separately from the OS software; and
subsequent to executing the OS or as part of executing the OS, execute a second containerized driver software for a second set of one or more hardware optical modules of the plurality of hardware optical modules, the second containerized driver software being packaged and deployed separately from the OS software and the first containerized driver software.

2. The system of claim 1, wherein the processing circuitry is further configured to:
instantiate a null container;
receive the first containerized driver software; and
update the null container with the first containerized driver software,
wherein to execute the first containerized driver software, the processing circuitry is configured to execute the first containerized driver software subsequent to the updating of the null container with the first containerized driver software.

3. The system of claim 1, wherein the processing circuitry is configured to output, to a container management framework, a request for the first containerized driver software in response to detecting that a first optical module of the first set of one or more hardware optical modules is plugged into a socket of the network element.

4. The system of claim 1, wherein the first containerized driver software is a first instance of the first containerized driver software, and wherein the processing circuitry is configured to:

receive a second instance of the first containerized driver software, the second instance being a replacement for the first instance; and execute the second instance of the first containerized driver software.

5. The system of claim 1, wherein the network element comprises a plurality of sockets, wherein each of the plurality of sockets is configured to couple to one of the plurality of hardware optical modules, wherein each of the sockets includes at least a portion of the processing circuitry, and wherein to execute the first containerized driver software, the portion of the processing circuitry associated with a first socket into which a hardware optical module of the first set of one or more hardware optical modules is coupled is configured to execute the first containerized driver software.

6. The system of claim 5, wherein at least the portion of the processing circuitry comprises a virtual machine.

7. The system of claim 1, wherein the OS software includes aggregated driver software for another set of one or more hardware optical modules of the plurality of hardware optical modules.

8. The system of claim 1, further comprising a cloud computing system executing a container management framework, wherein the container management framework is configured to:

receive a first driver software and libraries and services for the first driver software; and generate the first containerized driver software based on the first driver software and the libraries and services for the first driver software.

9. A method comprising:

executing, with processing circuitry, an operating system (OS) software configured to control operation of a plurality of hardware optical modules of a network element;

subsequent to executing the OS or as part of executing the OS, executing, with the processing circuitry, a first containerized driver software for a first set of one or more hardware optical modules of the plurality of hardware optical modules to enable the OS software and the first set of one or more hardware optical modules to communicate with each other, the first containerized driver software being packaged and deployed separately from the OS software; and subsequent to executing the OS or as part of executing the OS, executing, with the processing circuitry, a second containerized driver software for a second set of one or more hardware optical modules of the plurality of hardware optical modules, the second containerized driver software being packaged and deployed separately from the OS software and the first containerized driver software.

10. The method of claim 9, further comprising:

instantiating a null container;

receiving the first containerized driver software; and updating the null container with the first containerized driver software, wherein executing the first containerized driver software comprises executing the first containerized driver software subsequent to the updating of the null container with the first containerized driver software.

11. The method of claim 9, further comprising outputting, to a container management framework, a request for the first containerized driver software in response to detecting that a first optical module of the first set of one or more hardware optical modules is plugged into a socket of the network element.

12. The method of claim 9, wherein the first containerized driver software is a first instance of the first containerized driver software, the method further comprising:

receiving a second instance of the first containerized driver software, the second instance being a replacement for the first instance; and executing the second instance of the first containerized driver software.

13. The method of claim 9, wherein the network element comprises a plurality of sockets, wherein each of the plurality of sockets is configured to couple to one of the plurality of hardware optical modules, wherein each of the sockets includes at least a portion of the processing circuitry, and wherein executing the first containerized driver software comprises executing, with the portion of the processing circuitry associated with a first socket into which a hardware optical module of the first set of one or more hardware optical modules is coupled, the first containerized driver software.

14. The method of claim 13, wherein at least the portion of the processing circuitry comprises a virtual machine.

15. The method of claim 9, wherein the OS software includes aggregated driver software for another set of one or more hardware optical modules of the plurality of hardware optical modules.

16. The method of claim 9, further comprising:

receiving, with a cloud computing system executing a container management framework, a first driver software and libraries and services for the first driver software; and generating the first containerized driver software based on the first driver software and the libraries and services for the first driver software.

17. A non-transitory computer-readable storage medium comprising instructions stored thereon that when executed cause one or more processors to:

execute an operating system (OS) software configured to control operation of a plurality of hardware optical modules of a network element;

subsequent to executing the OS or as part of executing the OS, execute a first containerized driver software for a first set of one or more hardware optical modules of the plurality of hardware optical modules to enable the OS software and the first set of one or more hardware optical modules to communicate with each other, the first containerized driver software being packaged and deployed separately from the OS software; and subsequent to executing the OS or as part of executing the OS, execute a second containerized driver software for a second set of one or more hardware optical modules of the plurality of hardware optical modules, the second containerized driver software being packaged and deployed separately from the OS software and the first containerized driver software.

* * * * *